United States Patent
Zhang et al.

(10) Patent No.: US 7,689,977 B1
(45) Date of Patent: Mar. 30, 2010

(54) OPEN MULTI-PROCESSING REDUCTION IMPLEMENTATION IN CELL BROADBAND ENGINE (CBE) SINGLE SOURCE COMPILER

(75) Inventors: Guansong Zhang, Markham (CA); Shimin Cui, Toronto (CA); Ettore Tiotto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/423,894

(22) Filed: Apr. 15, 2009

(51) Int. Cl.
*G06F 9/45* (2006.01)

(52) U.S. Cl. .................................................. 717/149
(58) Field of Classification Search ................. 717/149
See application file for complete search history.

(56) References Cited

U.S. PATENT DOCUMENTS

| | | | |
|---|---|---|---|
| 7,240,059 B2 * | 7/2007 | Bayliss et al. ................. | 707/10 |
| 2003/0126589 A1 | 7/2003 | Poulsen et al. | |
| 2004/0162952 A1 * | 8/2004 | Feind et al. ................. | 711/147 |
| 2007/0089105 A1 * | 4/2007 | Archambault et al. ........ | 717/151 |
| 2008/0010296 A1 * | 1/2008 | Bayliss et al. ................. | 707/10 |
| 2008/0127146 A1 | 5/2008 | Liao et al. | |
| 2008/0256330 A1 * | 10/2008 | Wang et al. .................... | 712/24 |

OTHER PUBLICATIONS

Duran et al., Automatic Thread Distribution for Nested Parallelism in OpenMP, 2005, ACM, pp. 1-10.*

* cited by examiner

*Primary Examiner*—John Chavis
(74) *Attorney, Agent, or Firm*—Suiter Swantz pc llo

(57) ABSTRACT

The present disclosure is directed to a method for providing an OpenMP reduction implementation. The method may comprise creating an aggregate of at least one reduction variable in a parallel region or a work-sharing construct; defining a pointer variable, the pointer variable pointing to a dynamic array of the aggregate; creating an initialization routine, an outlined routine and a reduction accumulation routine; replacing the parallel region or the work-sharing construct with a runtime routine, the runtime routine taking a plurality of arguments including an address of the initialization routine, an address of the outlined routine, an address of the reduction accumulation routine, an address of the pointer variable, and a size of the aggregate; and executing the runtime routine when the at least one reduction variable is in the parallel region or the work-sharing construct.

1 Claim, 1 Drawing Sheet

OPEN MULTI-PROCESSING REDUCTION IMPLEMENTATION IN CELL BROADBAND ENGINE (CBE) SINGLE SOURCE COMPILER

TECHNICAL FIELD

The present disclosure generally relates to the field of computer technology, and more particularly to a method for providing Open Multi-Processing (OpenMP) reduction implementations.

BACKGROUND

Open Multi-Processing (OpenMP) is an application programming interface (API) that supports multi-platform shared memory multiprocessing programming on various architectures, including Unix and Microsoft Windows platforms. In OpenMP, variables for which we only want to have one copy, but which need to be modifiable by all processors may be referred to as "reduction variables". For example, a loop for calculating a sum of each entry of a vector into a variable called SUM may specify the variable SUM as a reduction variable.

SUMMARY

The present disclosure is directed to a method for providing an OpenMP reduction implementation. The method may comprise creating an aggregate of at least one reduction variable in a parallel region or a work-sharing construct; defining a pointer variable, the pointer variable pointing to a dynamic array of the aggregate; creating an initialization routine, an outlined routine and a reduction accumulation routine; replacing the parallel region or the work-sharing construct with a runtime routine, the runtime routine taking a plurality of arguments including an address of the initialization routine, an address of the outlined routine, an address of the reduction accumulation routine, an address of the pointer variable, and a size of the aggregate. The method may execute the runtime routine when the at least one reduction variable is in the parallel region, further comprising: allocating a memory for the dynamic array by a PowerPC Unit (PPU); executing the initialization routine by the PPU; executing the outlined routine by a plurality of Synergistic Processing Unit (SPU) threads; and executing the reduction accumulation routine by the PPU. The method may execute the runtime routine when the at least one reduction variable is in the work-sharing construct, further comprising: allocating a memory in the PPU memory space for the dynamic array by a first SPU thread to reach the work-sharing construct; executing the initialization routine by each of the plurality of SPU threads; executing the outlined routine by each of the plurality of SPU threads; and executing the reduction accumulation routine by a last SPU thread to leave the work-sharing construct.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
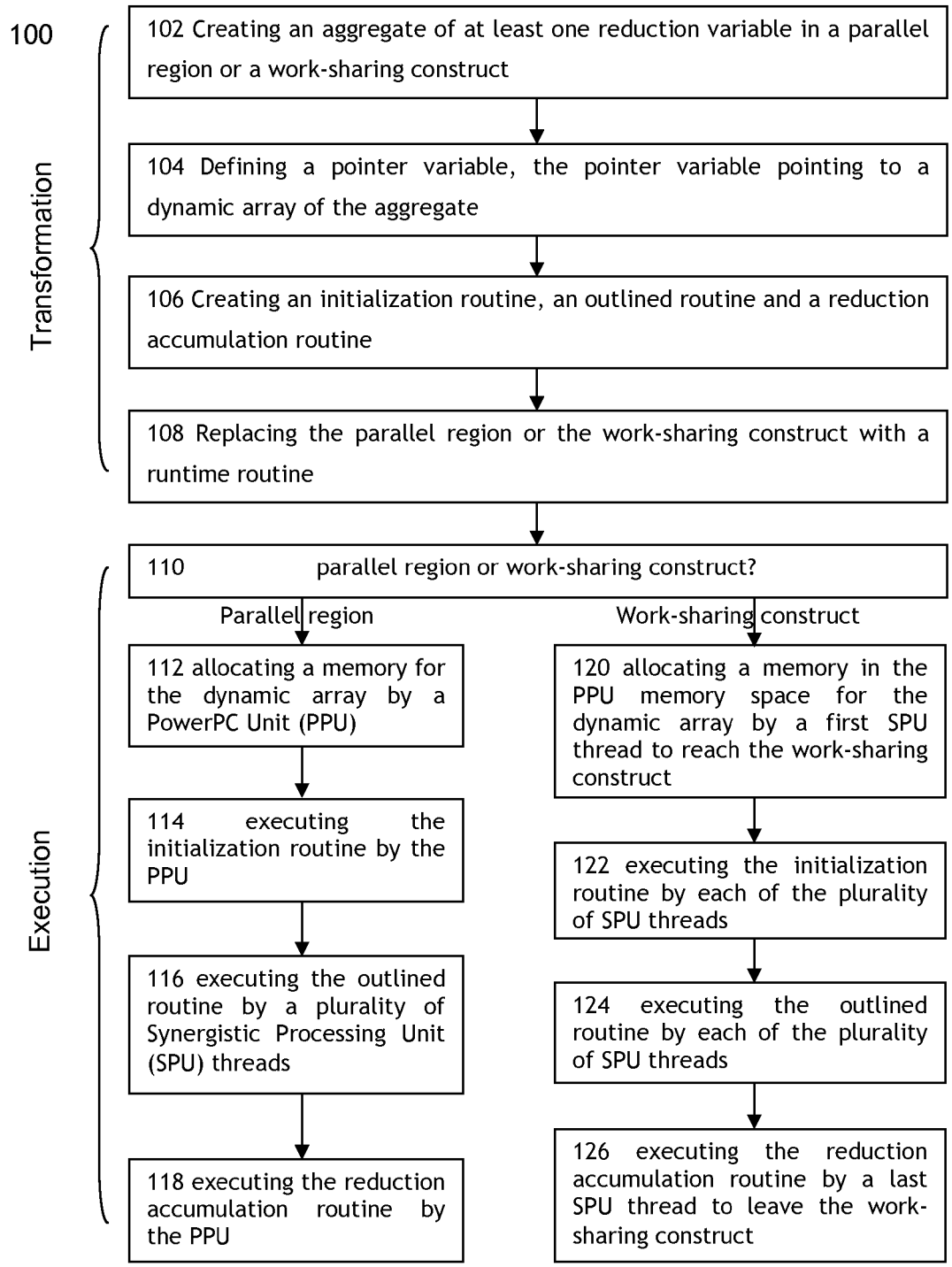
FIG. 1 is a flow diagram illustrating a method for providing an OpenMP reduction implementation.

Reference will now be made in detail to the subject matter disclosed, which is illustrated in the accompanying drawings.

In Open Multi-Processing (OpenMP), variables for which we only want to have one copy, but which need to be modifiable by all processors may be referred to as "reduction variables". For example, a loop for calculating a sum of each entry of a vector into a variable called SUM may specify the variable SUM as a reduction variable. In a reduction operation, a binary operator may be applied repeatedly to a variable and some other value and the result may be stored back in the variable.

The reduction operation may be executed in parallel. For this purpose, OpenMP may provide a "reduction" clause which may be utilized for performing the recurrence calculations in parallel. For instance, the following exemplary code may utilize a reduction clause to define two reduction variables, namely, SUM and PROD:

```
#pragma omp for reduction(+: SUM, *: PROD)
for (i=1; i<N; i++) {
SUM=SUM+A[i]
PROD=PROD*B[i]
```

One implementation for the OpenMP reduction operation may be to create a local copy of reduction variables for each parallel thread and initialize them accordingly based on the operators. These local copies may be updated locally by the threads, and at the end of the region or work-sharing construct, these local copies may be combined through the operator into a single value. For instance, the implementation for the reduction variables SUM and PROD may be defined as follows:

```
localSum=0;
localProd=1;
for (i=low; i<upper; i++)
localSum=localSum+A[i]
localProd=localProd*B[i]
}
// critical update begin
SUM=SUM+localSum;
PROD=PROD*localProd;
// critical update end
```

In the above implementation, the atomicity of the final reduction may be required by the compiler for an exclusive access to the single memory address corresponding to the reduction variables for the duration of the update.

In an alternative implementation for the OpenMP reduction operation, in order to reduce/eliminate access to the shared reduction variables due to the synchronization of their critical update, the partial results for the reduction variables may be stored in an array that has an extra dimension corresponding to the number of threads. The arrays may be initialized, and each thread may update the corresponding entries of the reduction variables. Upon completion of the updating process, the partial results of the array elements calculated by the threads may be summed up to determine the final value of the reduction variables. For instance, the implementation for the reduction variables SUM and PROD may be defined as follows under this approach:

```
// Initialize the array for all the threads
for (this_thread=0; this_thread<number_of_thread; this_
thread++)
    localSum(this_thread)=0;
    localProd(this_thread)=1;
}
// Compute partial results for each thread
for (i=low; i<upper; i++) {
    localSum(this_thread)=localSum(this_thread)+A[i]
    localProd(this_thread)=localProd(this_thread)*B[i]
}
// Reduce when all partial results are available
for (this_thread=0; this_thread<number_of_thread; this_
thread++)
    SUM=SUM+localSum(this_thread)
    PROD=PROD*localProd(this_thread)
}
```

The above approach may be complex when implemented on an OpenMP system on a heterogeneous system (e.g., Cell Broadband Engine Architecture, or Cell/BE). The Cell/BE (CBE or Cell) architecture is a heterogeneous system comprising a PowerPC unit (PPU) and a plurality of (e.g., eight) Synergistic Processing Units (SPUs).

The present disclosure is directed to a method/mechanism for providing an implementation for OpenMP reduction operations on a heterogeneous system such as Cell/BE. The implementation of the present disclosure may manage the data and the execution of reductions efficiently on both PPU and SPUs by determining where the memory for the partial results is allocated, which processor to execute the initialization, and which processor to execute the finalization of the reduction.

The implementation of the present disclosure may partition the reduction computation into three steps: 1) initialization; 2) partial sum reduction; and 3) final accumulation. The implementation may separate jobs between PPU and SPU for the steps listed above, and cooperate between the compiler and runtime for access data in a distributed memory system. The implementation may also organize data to achieve the maximum efficiency of the direct memory access (DMA) read and write.

In one embodiment, the method for providing OpenMP implementation may comprise compiler analysis and runtime memory management for a parallel region or a work-sharing construct when one or more reduction variables are present.

FIG. 1 shows a flow diagram illustrating steps performed by a method 100 in accordance with the present disclosure. The method 100 may be utilized for providing an OpenMP reduction implementation. In one embodiment, the method 100 may comprise a transformation process and an execution process.

The transformation process may analyze one or more reduction variables in a given parallel region or a work-sharing construct, and create a pointer variable of dynamic array and insert a call to a run-time library routine. The run-time library routine may be configured for starting up threads of execution to compute partial results of reduction variables and store them in the dynamic array created by the compiler. The partial results may be aggregated in later steps.

In one embodiment, the transformation process may comprise step 102 for creating an aggregate of at least one reduction variable in a parallel region or a work-sharing construct. An exemplary aggregate including the reduction variables SUM and PROD may be defined as follows:

```
struct reduction_aggrgate {
int*4 SUM;
int*4 PROD;
char*120 pad; // for sizing purposes
};
```

In this example, each member in the aggregate may correspond to a reduction variable determined by analyzing the scope of variables in the parallel region or the work-sharing construct. The size of the aggregate may be set to be a multiple of DMA blocking size in order to avoid false sharing. For instance, a padding variable may be utilized to set the size of the aggregate to the multiple of DMA blocking size. Variable pad is utilized in the above example to set the size of the aggregate to 128.

Step 104 may define a pointer variable pointing to a dynamic array. The elements of the dynamic array may be defined as the same type as the aggregate. The memory of the dynamic array may be allocated based on the number of threads that may execute the parallel region or the work-sharing construct. For example, a pointer
    reduction_aggrgate*reductions;
may be defined to point to the reduction_aggrgate created above.

Step 106 may analyze the body of the parallel region or the work-sharing construct and create an initialization routine, an outlined routine and a reduction accumulation routine accordingly. Each routine may contain a parameter representing/identifying a thread of execution of the code. Exemplary initialization routine, outlined routine and reduction accumulation routine for the reduction variables SUM and PROD of the previous example may be defined as follows:

```
foo@INIT(int*4 thread) {
reductionp[thread]·sum=0;
reductionp[thread]·prod=1;
}
foo@OL(int*4 low, int*4 upper, int*4 thread) {
sum=0; prod=1; // local initialization
for (I=low; I<upper; i++) {
    sum=sum+A[i];
    prod=prod*B[i];
}
reductionp[thread]·sum+=sum;
reductionp[thread]·prod*=prod;
}
foo@ACCUM(int*4 thread) {
SUM+=reductionp[thread]·sum;
PROD*=reductionp[thread]·prod;
}
```

In this example, the initialization routine (foo@INIT) may be used for initializing local variables for each thread. Each thread may update the corresponding element of the dynamic array of the aggregate through the outlined routine (foo@OL). The partial results calculated by the threads may be aggregated through the reduction accumulation routine (foo@ACCUM).

Step 108 may replace the parallel region or the work-sharing construct by a call to a runtime routine. The runtime routine may take a plurality of arguments including an address of the initialization routine, an address of the outlined routine, an address of the reduction accumulation routine, an address of the pointer variable, and a size of the aggregate. An exemplary runtime routine for the above example may be defined as follows:

runtime_routine(&foo@INIT, &foo@OL, &foo@SUM, &reductionp, 128, . . . )

The execution process of the method 100 may execute the runtime routine. The memory for the dynamic array of the aggregate may be allocated on a processor to achieve the maximum efficiency of the DMA read and write. The executions of initialization, partial summation, and final accumulation may be separated between PowerPC Unit (PPU) and Synergistic Processing Unit (SPU).

In one embodiment, the execution process 100 may determine whether the reduction variables are originally defined in a parallel region or a work-sharing construct in step 110.

If the reduction variables are originally defined in a parallel region, step 112 may allocate a memory for the dynamic array by the PPU. The size of the memory allocated may be the number of threads of execution in the unit of the size of the aggregate. Step 114 may execute the initialization routine by the PPU. Step 116 may execute the outlined routine (local computation for each thread) by a plurality of SPU threads. Step 118 may execute the reduction accumulation routine by the PPU to calculate the final results for the reduction variables.

If the reduction variables are originally defined in a work-sharing construct, step 120 may allocate a memory in the PPU memory space for the dynamic array. This memory allocation may be performed by the first SPU thread to reach the work-sharing construct. The size of the memory allocated may be the number of threads of execution in the unit of the size of the aggregate. PPU may be responsible for sending the address of the allocated memory to each SPU.

Step 122 may execute the initialization routine by each of the plurality of SPU threads. Step 124 may execute the outlined routine by each of the plurality of SPU threads. Step 126 may execute the reduction accumulation routine by the last SPU thread to leave the work-sharing construct.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing an OpenMP reduction implementation, comprising:
    creating an aggregate of at least one reduction variable in a parallel region or a work-sharing construct;
    defining a pointer variable, the pointer variable pointing to a dynamic array of the aggregate;
    creating an initialization routine, an outlined routine and a reduction accumulation routine;
    replacing the parallel region or the work-sharing construct with a runtime routine, the runtime routine taking a plurality of arguments including an address of the initialization routine, an address of the outlined routine, an address of the reduction accumulation routine, an address of the pointer variable, and a size of the aggregate;
    executing the runtime routine when the at least one reduction variable is in the parallel region, further comprising:
        allocating a memory for the dynamic array by a PowerPC Unit (PPU);
        executing the initialization routine by the PPU;
        executing the outlined routine by a plurality of Synergistic Processing Unit (SPU) threads; and
        executing the reduction accumulation routine by the PPU; and
    executing the runtime routine when the at least one reduction variable is in the work-sharing construct, further comprising:
        allocating a memory in the PPU memory space for the dynamic array by a first SPU thread to reach the work-sharing construct;
        executing the initialization routine by each of the plurality of SPU threads;
        executing the outlined routine by each of the plurality of SPU threads; and
        executing the reduction accumulation routine by a last SPU thread to leave the work-sharing construct.

* * * * *